United States Patent
Kawazu et al.

(10) Patent No.: US 6,672,620 B2
(45) Date of Patent: Jan. 6, 2004

(54) VEHICLE BODY REAR PART STRUCTURE

(75) Inventors: Masahiro Kawazu, Wako (JP); Hiroshi Osato, Wako (JP); Yoshihiro Shimizu, Wako (JP); Tohru Ono, Wako (JP); Masanobu Yamashiro, Wako (JP); Masaru Shibasawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/232,195

(22) Filed: Aug. 28, 2002

(65) Prior Publication Data
US 2003/0042057 A1 Mar. 6, 2003

(30) Foreign Application Priority Data
Aug. 31, 2001 (JP) ........................................ 2001-262725

(51) Int. Cl.[7] .................................................. B60P 3/22
(52) U.S. Cl. ...................................................... 280/834
(58) Field of Search ................................. 280/830, 831, 280/832, 834

(56) References Cited

U.S. PATENT DOCUMENTS

| | | | | |
|---|---|---|---|---|
| 4,098,520 A | * | 7/1978 | Ezaki et al. ................. | 280/784 |
| 5,518,272 A | * | 5/1996 | Fukagawa et al. .......... | 280/834 |
| 5,794,979 A | * | 8/1998 | Kasuga et al. .............. | 280/834 |
| 5,997,040 A | * | 12/1999 | Fukagawa et al. .......... | 280/834 |

FOREIGN PATENT DOCUMENTS

JP  2000219050 A  8/2000

* cited by examiner

*Primary Examiner*—Kevin Hurley
(74) *Attorney, Agent, or Firm*—Lahive & Cockfield, LLP

(57) ABSTRACT

A vehicle body rear part structure includes left and right rear frames extending longitudinally of the vehicle body, a plurality of parallel spaced cylindrical fuel tanks disposed horizontally between the left and right rear frames with the axes of the fuel tanks extending normal to the left and right rear frames and disposed below the center of a height of the rear frames, and a cross member disposed between two adjacent ones of the fuel tanks and extending between the left and right rear frames. The cross member reinforces the rear frames to such an extent that fuel tanks of larger capacity can be carried on the vehicle body rear part structure.

3 Claims, 8 Drawing Sheets

(EMBODIMENT)

VEHICLE BODY REAR PART STRUCTURE

FIELD OF THE INVENTION

The present invention relates to a rear part structure of a vehicle body and more particularly to a vehicle body rear part structure carrying thereon a fuel tank filled with a gaseous fuel such as hydrogen.

BACKGROUND OF THE INVENTION

Fuel-cell vehicles are known, which comprise an electric motor rotatably driven by electric energy generated from a fuel cell supplied with hydrogen and oxygen (air). In some known fuel-cell vehicles, a fuel tank filled with hydrogen is mounted on a rear part of the vehicle body for supplying hydrogen to the fuel cell.

One example of such vehicle body rear part structure is disclosed in Japanese Patent Laid-open Publication No. 2000-219050, entitled "Cylinder Mounting Structure". The disclosed structure includes a small-diameter cylinder and a large-diameter cylinder both disposed below a rear floor panel. The small-diameter cylinder is located below a vehicle rear seat, and the large-diameter cylinder is located below a luggage compartment provided behind the vehicle rear seat. The small- and large-diameter cylinders (or fuel tanks) are carried on a cylinder holder. The cylinder holder has a mid member extending crosswise between left and right side members of the vehicle body and connected at opposite ends to the side members so as to support a central portion of the cylinder holder with respect to the vehicle body.

In the disclosed prior structure, since the mid member is so arranged as to extend in and along a channel-like space defined between lower halves of the small- and large-diameter cylinders or tanks, the opposite end portions of the mid member must be bent upward for enabling attachment of the mid member relative to the vehicle body. The mid member having such bent end portions is, however, susceptible to deformation or yielding when the vehicle is subjected to an impact force. The potential deformation of the mid member is considered when the size of the cylinders is determined. Thus, the relatively easy-to-deform mid member used in the cylinder holder considerably limits the maximum capacity of the cylinders.

SUMMARY OF THE INVENTION

It is accordingly an object of the present invention to provide a vehicle body rear part structure which is highly stiff and hence can accommodate fuel tanks of larger capacity in spaces defined in the vehicle body rear part structure.

To achieve the foregoing object, according to the present invention, there is provided a rear part structure of a vehicle body, comprising: a left rear frame and a right rear frame extending longitudinally of the vehicle body; a plurality of parallel spaced cylindrical fuel tanks disposed horizontally between the left and right rear frames, the cylindrical fuel tanks having longitudinal axes extending normal to the left and right rear frames and located below the center of a height of the left and right rear frames; and a cross member disposed between two adjacent ones of the fuel tanks and extending between the left and right rear frames.

Since the axes of the fuel cylinders are located below the center of the height of the left and right rear frames, upper halves of the two adjacent cylinders define therebetween a generally V-shaped space or channel extending normal to the left and right rear frames. The V-shaped channel is used to accommodate the cross member which is straight or of a rectilinear configuration. The cross member preferably has a straight or rectilinear configuration, and the straight cross member is stiffer than the curved or bent cross member used in the conventional vehicle body rear part structure. The rear frames reinforced by the straight cross member is highly resistant to deformation and can accommodate fuel tanks of larger capacity.

In one preferred form of the invention, the left and right rear frames are each formed from a bent frame including a first straight portion extending in a longitudinal direction of the vehicle body, a slanting portion extending obliquely inward from a rear end of the first straight portion toward a longitudinal centerline of the vehicle body, and a second straight portion extending from a rear end of the slanting portion in the longitudinal direction of the vehicle body. The straight cross member extends between the slanting portions of the left and right rear frames.

When the bent rear frames are subjected to a compressive force, they tend to deform at the slanting portions. However, by virtue of the cross member extending between the slanting portions, deformation of the slanting portion does not occur and the fuel tanks are thus reinforced for protection against damage.

The cross member may have opposite end portions flared such that each of the flared end portions extends at an angle of from 90 to 180 degrees relative to the longitudinal axis of the slanting portion of a corresponding one of the left and right rear frames.

The cross member having such flared end portions can bear a larger part of an impact force applied to rear ends of the left and right rear frames without causing stress concentration at the junction between the cross member and the left and right rear frames.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

Figure 1:
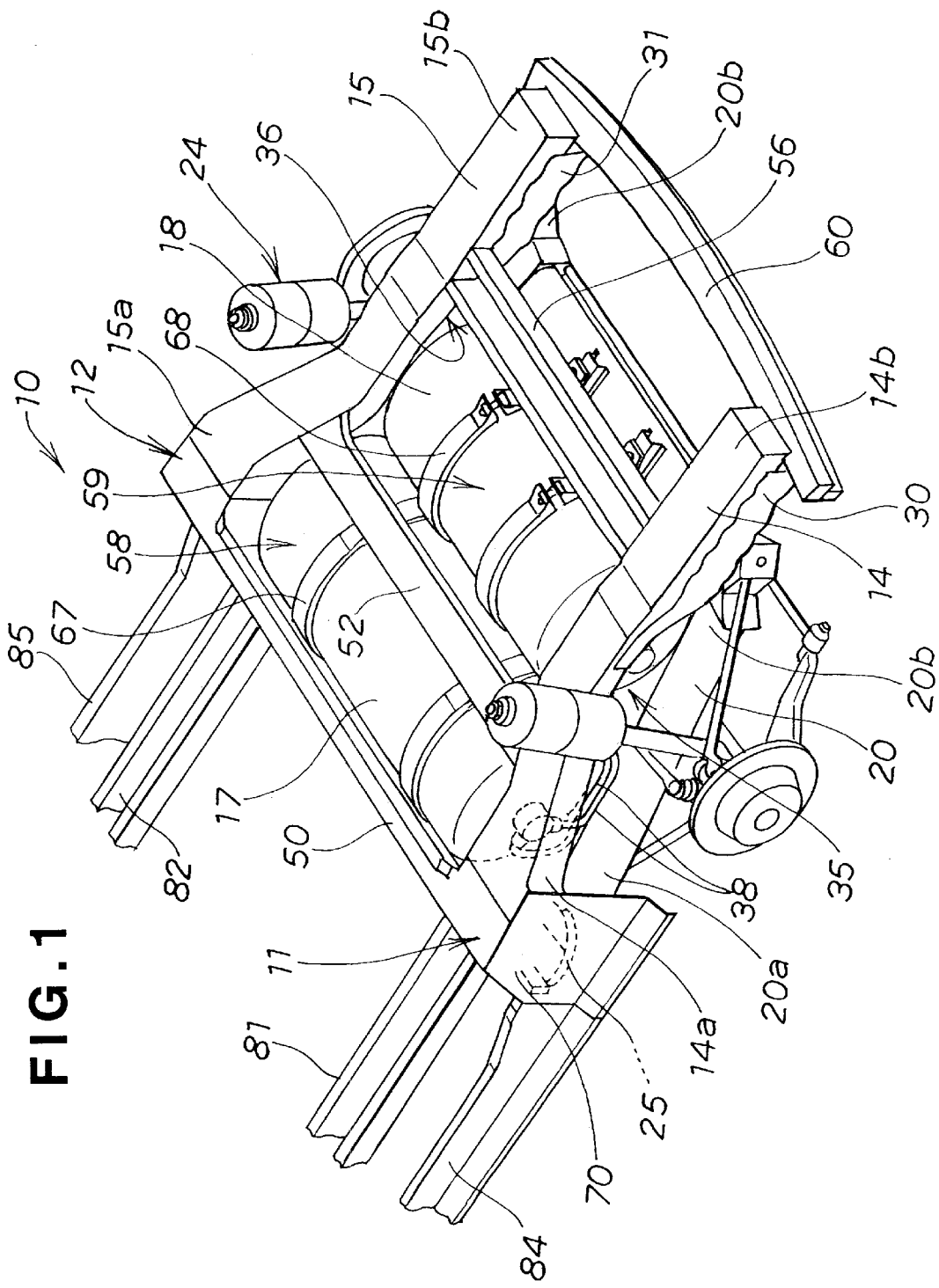
FIG. 1 is a schematic perspective view of a vehicle body rear part structure according to an embodiment of the present invention.

Referring now to the drawings and FIG. 1 in particular, there is shown a vehicle body rear part structure 10 according to an embodiment of the present invention. As shown in this figure, the vehicle body rear part structure 10 includes left and right rear frames 14 and 15 that form respective rear parts of left and right body frames 11 and 12, and first and second fuel tanks 17 and 18 of cylindrical shape that are mounted to the rear frames 14, 15. The fuel tanks 17, 17 are disposed horizontally between the left and right rear frames 14, 15 and have respective axes extending normal to the longitudinal axes of the rear frames 14, 15 and disposed below the center of a height of the rear frames 14, 15. The rear frames 14, 15 have a generally U-shaped cross section as will be described later with reference to FIG. 7, but, for purposes of illustration, in several views including FIG. 1 the rear frames 14, 15 are not shown as being U-shaped in cross section.

The vehicle body rear part structure 10 further includes left and right front brackets 25 and 26 (the left front bracket 26 being shown in FIG. 3) disposed between respective front ends 14a, 15a of the left and right rear frames 14, 15 and left and right front ends 20a, 20a of a support frame 20, and left and right rear brackets 30, 31 disposed between respective rear ends 14b, 15b of the left and right rear frames 14, 15 and left and right rear ends 20b, 20b of the support frame 20. The front and rear brackets 15, 16 and 30, 31 are arranged such that there are defined, between the left and right rear frames 14, 15 and the support frame 20, a pair of laterally aligned openings 35 and 36, each opening receiving or accommodating within it a set of pipe systems 38 and 39 (the pipe system 39 being shown in FIG. 2) connected to respective left or right ends of the fuel tanks 17, 18 and auxiliary devices, such as valves (not shown) assembled with the pipe systems 38, 39 (FIG. 2).

Figure 2:
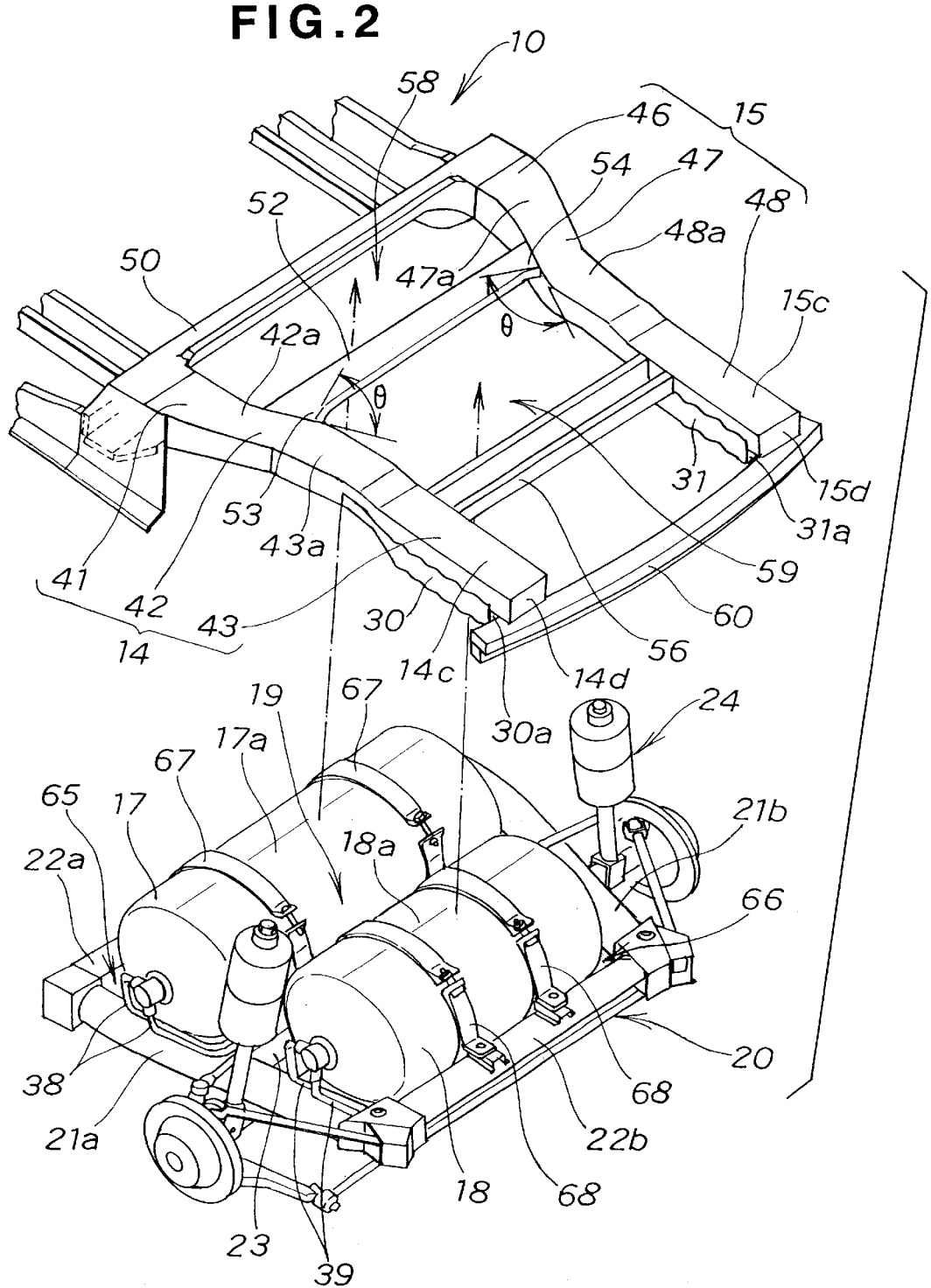
FIG. 2 is an exploded perspective view of the vehicle body rear part structure.

As shown in FIG. 2, the first and second cylindrical fuel tanks 17, 15 are carried on the support frame 20. The support frame 20 has a rectangular frame shape. A rear suspension unit 24 is assembled with the support frame 20. With the fuel tanks 17, 18 and the rear suspension unit 24 being assembled with the support frame 20, the support frame 20 is attached to the left and right rear frames 14, 15 from below, as indicated by arrows shown in FIG. 2.

Since the fuel tanks 17, 18, the rear suspension unit 24 and the support frame 20 are assembled in advance as a single module or unit, they can readily be assembled with the left and right rear frames 14, 15 merely by attaching the support frame 20 to the rear frames 14, 15 from below. This will increase the productivity of the vehicle. In addition, use of the module 17, 18, 24, 20 can reduce the number of fastening parts relative to the rear frames 14, 15, which may lead to the weight- and cost-reduction of the vehicle.

The left rear frame 14 has a front straight portion 41 extending along the longitudinal axis of the vehicle body, an intermediate slanting portion 42 extending obliquely inward from a rear end of the front straight portion 41 in a rearward direction of the vehicle body, and a rear straight portion 43 extending from a rear end of the intermediate slanting portion 42 in the longitudinal direction of the vehicle body.

When viewed from the rear straight portion 43, the intermediate slanting portion 42 of the left rear frame 14 extends obliquely outward from a front end 43a of the rear straight portion 43, and the front straight portion 41 extends from a front end 42a of the intermediate slanting portion 42 in the longitudinal direction of the vehicle body. Due to the presence of the intermediate slanting portion 42, the front straight portion 41 of the left rear frame 14 is offset from the rear straight portion 43 in a lateral outward direction of the vehicle body.

Similarly, the right rear frame 15 has a front straight portion 46 extending along the longitudinal axis of the vehicle body, an intermediate slanting portion 47 extending obliquely inward from a rear end of the front straight portion 46 in a rearward direction of the vehicle body, and a rear straight portion 48 extending from a rear end of the intermediate slanting portion 47 in the longitudinal direction of the vehicle body.

When viewed from the rear straight portion 48, the intermediate slanting portion 47 of the right rear frame 15 extends obliquely outward from a front end 48a of the rear straight portion 48, and the front straight portion 46 extends from a front end 47a of the intermediate slanting portion 47 in the longitudinal direction of the vehicle body. Due to the presence of the intermediate slanting portion 47, the front straight portion 46 of the right rear frame 15 is offset from the rear straight portion 48 in a lateral outward direction of the vehicle body.

The left and right rear frames 14, 15 are connected together by three cross members 50, 52 and 56 spaced in the longitudinal direction of the vehicle body. The front cross member 50 extends transversely between the front straight portions 42, 46 of the left and right rear frames 14, 15 and interconnects front ends of the front straight portions 42, 46. The central cross member 52 extends between the left and right intermediate slanting portions 42, 47 of the left and right rear frames 14, 15. The rear cross member 56 extends transversely between the rear straight portions 43, 48 of the left and right rear frames 14, 15 and interconnects longitudinal intermediate portions of the rear straight portions 43, 48.

The left and right rear frames 14, 15 and the front and central cross members 50, 52 jointly define therebetween a generally rectangular first space or opening 58 for receiving therein an upper part of the first fuel tank 17. Similarly, the left and right rear frames 14, 15 and the central and rear cross members 52, 56 jointly define therebetween a generally rectangular second space or opening 59 for receiving therein an upper part of the second fuel tank 18.

Since the slanting portions 42, 47 of the left and right rear frames 11, 12 flare or diverge in a forward direction of the vehicle body, the first space 58 has a larger size than the second space 59 in the widthwise direction of the vehicle body. With this arrangement, the first fuel tank 17 can be made longer than the second fuel tank 18. This means that the first fuel tank 17 may have a larger capacity than the second fuel tank 18 provided that the first and second fuel tanks 17, 18 have the same diameter.

Additionally, the rectangular frame-shaped portions 50, 14, 52, 15 and 52, 14, 56, 15 each defining one of the first and second spaces 58, 59 are structurally rigid against deformation and can retain their original shapes even when the left and right rear frames 14, 15 are subjected to external forces. Accordingly, the first and second fuel tanks 17, 18 partly received in the first and second spaces 58, 59, respectively, are safely protected against damage. The structurally rigid frame-shape portions 50, 14, 52, 15 and 52, 14, 56, 15 further ensures that the entire areas of the first and second spaces 58, 59 can be used exclusively for accommodation of the first and second tanks 17, 18. This leads to enlargement of the capacity of the fuel tanks 17, 18 and the resulting extension of cruising distance of the vehicle.

Figure 6:
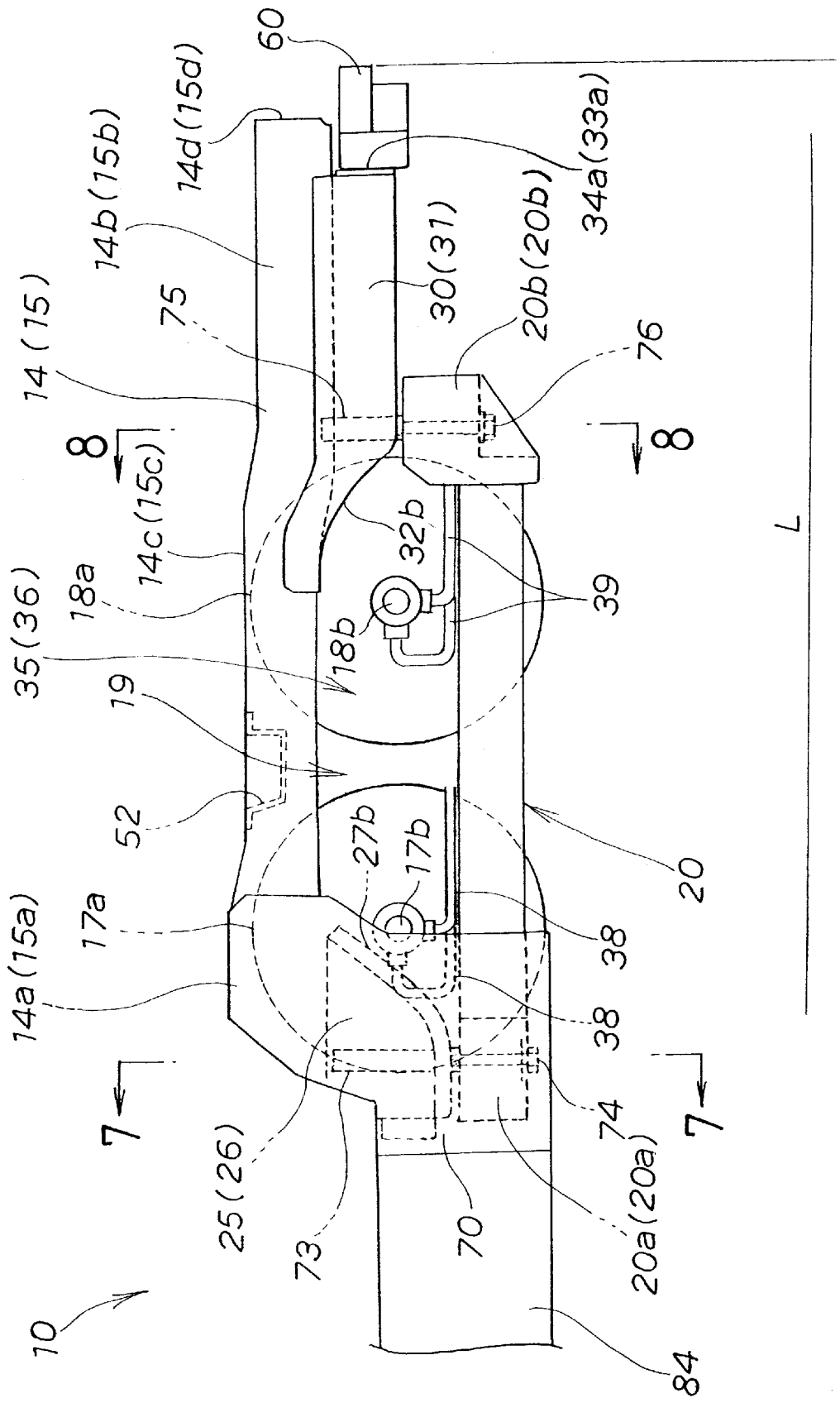
FIG. 6 is a left side view of the vehicle body rear part structure.

As shown in FIG. 6, the first and second fuel tanks 17, 18 are arranged such that respective upper ends 17a, 18a of the first and second fuel tanks 17, 18 do not project from, or preferably lie substantially flush with, upper surfaces 14c, 15c of the left and right rear frames 14, 15. Upper halves of the fuel tanks 17, 18 jointly form a generally V-shaped groove or channel 19 flaring upward. This arrangement allows the central cross member 52 to be located in and extend along the V-shaped channel 19. The central cross member 52 has a rectilinear configuration in the same member as the front and rear cross members 50, 56. The cross members 50, 52, 56 of the rectilinear configuration are per se rigid and resistant to compressive forces as compared to those having a curvilinear configuration. The cross members 50, 52, 56 can, therefore, perform a sufficient reinforcing function with respect to the left and right rear frames 14, 15.

Referring back to FIG. 2, left and right end portions 53, 54 of the central cross member 52 are gradually widened or flared such that a sidewall on the rear side of each flared end portion 53, 54 extends at an angle θ of from 90 to 180 degrees (namely, θ is a right angle or an obtuse angle) relative to the longitudinal axis of a corresponding one of the slanting portions 42, 47. When the left and right rear frames 14, 15 are subjected to an impact force, the flared end portions 53, 54 of the central cross member 52 effectively transmit the impact force from the left and right slanting portions 42, 47 to the cross member 52, thereby preventing stress concentration from occurring at a junction or joint between each slanting portion 42, 47 and the cross member 52.

Rear end faces 30a, 31a of the left and right rear brackets 30, 31 are located forward of rear end faces 14d, 15d of the left and right rear frames 14, 15, and a rear bumper beam 60 is connected to the rear end faces 30a, 31b of the rear brackets 30, 31 so as to extend transversely across a space between the left and right rear frames 14, 15.

The support frame 20 has a generally rectangular frame shape and includes a pair of laterally spaced left and right frame members 21a, 21b, a front frame member 22a interconnecting front ends of the left and right frame members 21a, 21b, and a rear frame member 22b interconnecting rear ends of the left and right frame members 21a, 21b. The rectangular frame-shaped support frame 20 further has a central frame member 23 disposed centrally between the front and rear frame members 22a, 22b and extending transversely between the left and right frame members 21a, 21b.

The support frame 20 of the foregoing construction has a first space or opening 65 defined between the front and central frame members 22a, 23, and a second space or opening 66 defined between the central and rear frame members 23, 22b. The first and second fuel tanks 17, 18 are carried on the support frame 20 and held in a horizontal posture with lower portions of the fuel tanks 17, 18 being received in the first and second spaces 65, 66, respectively. The first fuel tank 17 is held immovable on the support frame 20 by means of a pair of clamp belts or straps 67 secured at opposite ends to the front and central frame members 22a, 23. Similarly, the second fuel tank 18 is held immovable on the support frame 20 by means of a pair of clamp belts or straps 68 secured at opposite ends to the central and rear frame members 23, 22b. The rear suspension unit 24 is assembled with the support frame 20.

Figure 3:
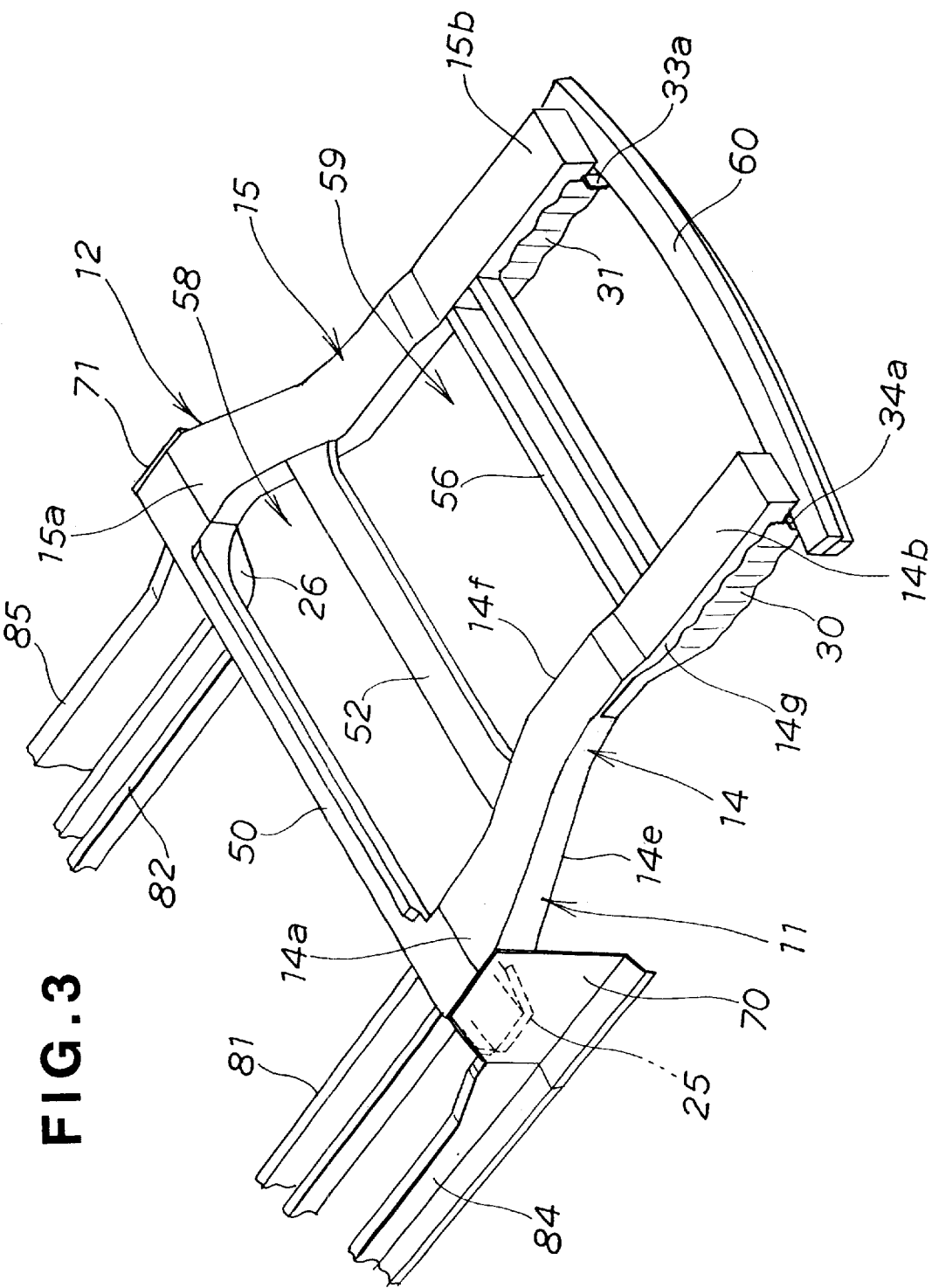
FIG. 3 is a schematic perspective view of left and right rear frames of the vehicle body rear part structure.

As shown in FIG. 3, the left front bracket 25 is connected to a lower side of the front end 14a of the left rear frame 14. To cover the left front bracket 25 from an outer side thereof, a left inside sill extension 70 is attached to an outer side of the front end 14a of the left rear frame 14. The left rear bracket 30 is connected to a lower side of the rear end 14b of the left rear frame 14. Similarly, the right front bracket 26 is connected to a lower side of the front end 15a of the right rear frame 15. A right inside sill extension 71 is attached to an outer side of the front end 15a of the right rear frame 15 so as to cover the right front bracket 25. The right rear bracket 31 is connected to a lower side of the rear end 15b of the right rear frame 15.

The left inside sill extension 70 is connected to the rear end of a left inside sill 84. The inside sill 84 extends forward of the vehicle body. A left middle frame 81 extends forwardly from the front end 14a of the left rear frame 14. The left inside sill 84, left inside sill extension 70, left middle frame 81 and left rear frame 14 together form the left vehicle frame 11. Similarly, the right inside sill extension 71 is connected to the rear end of a right inside sill 85. The right inside sill 85 extends forward of the vehicle body. A right middle frame 82 extends forwardly from the front end 15a of the right rear frame 15. The right inside sill 85, right inside sill extension 71, right middle frame 82 and right rear frame 15 together form the right vehicle frame 12.

Figure 4:
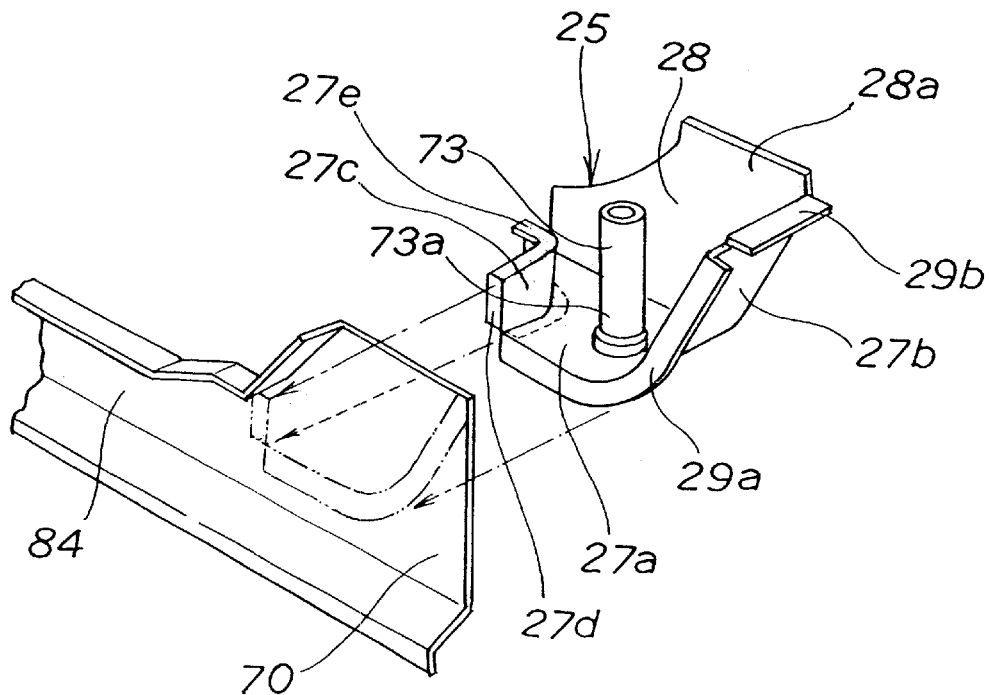
FIG. 4 is an exploded perspective view of a portion of the vehicle body rear part structure including a left front bracket and a left inside sill extension.

FIG. 4 shows in exploded perspective view structural details of the left front bracket 25 in conjunction with the left inside sill extension 70. As shown in this figure, the left front bracket 25 includes a flat bottom wall 27a, a sloped rear wall 27b extending obliquely upward from a rear end of the bottom wall 27a in a rearward direction of the vehicle body, an inner sidewall 28 extending vertically upward from an inner edge (right side in FIG. 4) of the bottom wall 27a and an inner edge (right side in FIG. 4) the rear wall 27b, and a front wall 27c extending vertically upward from. The front wall 27c is connected by welding to the front end of the bottom wall 27a. The left front bracket 25a also has a front flange 27e extending along portion of an upper edge of the front wall 27c, a side flange 29a extending along outer edges (left side in FIG. 4) of the bottom and rear walls 27a, 27b, and a rear flange 29b extending along an upper edge of the rear wall 27b. The front wall 27c has an outer side surface 27d. An upper end portion 28a of the inner sidewall 28 projects upward from the plane of the rear flange 29b.

A front sleeve nut 73 is vertically disposed on the bottom wall 27a of the left front bracket 25 and firmly connected at its lower end 73a to an upper surface of the bottom wall 27a.

The side flange 29a of the bottom and rear walls 27a, 27b and the outer side surface 27d of the front wall 27c are attached to an inner surface of the left inside sill extension 70, the rear flange 29b is attached to a lower surface 14e (FIG. 3) of the left rear frame 14, the front flange 27e is attached to a lower surface of the front cross member 50 (FIG. 3), and the upper end portion 28a of the inner sidewall 28 is attached to an inner side surface 14f (FIG. 3) of the left rear frame 14. The left front bracket 25 is thus attached to the left rear frame 14. In an attached or assembled condition, the bottom wall 27a of the left front bracket 25 is spaced by a predetermined distance from the lower surface 14e of the left rear frame 14.

The left front bracket 25 and the right front bracket 26 (FIG. 3) are mirror images of each other, and a further description of the right front bracket 26 can be omitted.

Figure 5:
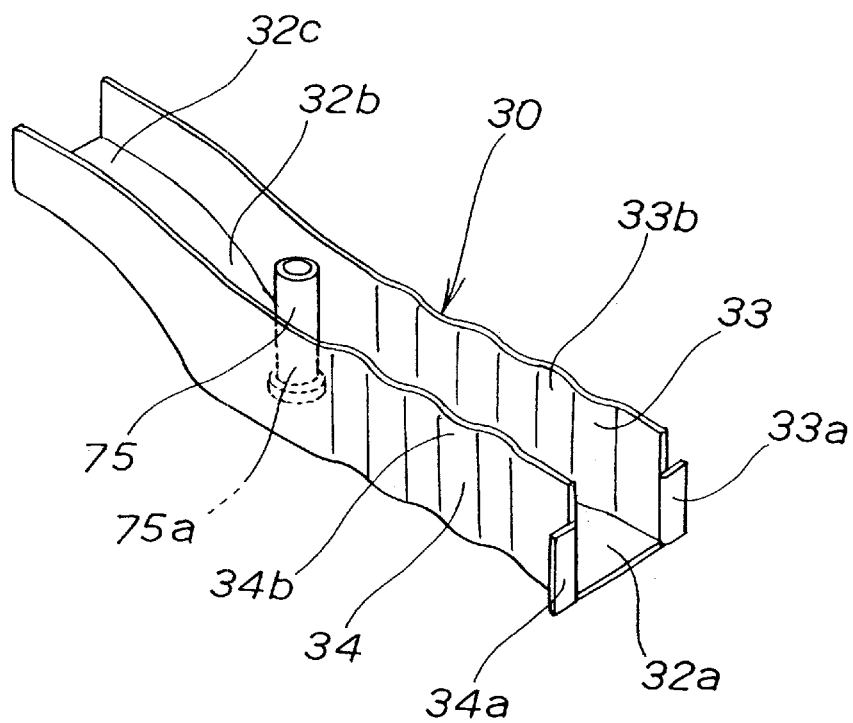
FIG. 5 is a perspective view of a left rear bracket of the vehicle body rear part structure.

FIG. 5 shows in exploded perspective view structural details of the left rear bracket 30. As shown in this figure, the left rear bracket 30 has a generally channel shape and includes a flat bottom wall 32a spaced downward by a predetermined distance from the lower surface 14e (FIG. 3) of the left rear frame 14, a sloped front wall 32b extending obliquely upward from a front end of the bottom wall 32a in a forward direction of the vehicle body, and a pair of opposed inner and outer sidewalls 33 and 34 extending vertically upward from inner edges and outer edges, respectively, of the bottom and front walls 32a, 32b. The sidewalls 33, 34 have flanges 33a, 34a at rear ends thereof. Upper portions 33b, 34b of the sidewalls 33, 34 project upward from the flanges 33a, 34a.

A rear sleeve nut 75 is vertically disposed on the bottom wall 32a of the left rear bracket 30 and firmly connected at its lower end 75a to an upper surface of the bottom wall 32a.

The upper portion 33b of the inner sidewall 33 is attached to the inner side surface 14f (FIG. 3) of the left rear frame 14, the upper portion 34b of the outer sidewall 34 is attached to an outer side surface 14g (FIG. 3) of the left rear frame 14, an upper end portion 32c of the front wall 32b is attached to the lower surface 14e (FIG. 3) of the left rear frame 14, and the flanges 33a, 34a are attached to the rear bumper beam 60 (FIG. 3). The left rear bracket 30 is thus attached to the left rear frame 14 and the rear bumper beam 60. The flanges 33a, 34a provide a rear end face of the left rear bracket 30.

The left rear bracket 30 and the right rear bracket 31 (FIG. 3) have the same structure, and a further description of the right rear bracket 31 can be omitted.

FIG. 6 is a side view showing the vehicle body rear part structure 10 with the suspension unit 24 omitted for clarity. As shown in this figure, the left and right front brackets 25, 26 are disposed between the respective front ends 14a, 15a of the left and right rear frames 14, 15 and left and right front ends 20a, 20a of the support frame 20, and the left and right rear brackets 30, 31 are disposed between the respective rear ends 14b, 15b of the left and right rear frames 14, 15 and left and right rear ends 20b, 20b of the support frame 20.

By thus arranging the front and rear brackets 25, 26 and 30, 31, there is defined, between the left and right rear frames 14, 15 and the support frame 20, a pair of laterally aligned spaces or openings 35, 36 in which the pipe systems 38 and 39 connected to respective left or right ends of the fuel tanks 17, 18 and including auxiliary devices, such as valves (not shown) are received. The openings 35, 36 have a common horizontal axis lying in the same horizontal plane as the central axes 17b, 18b of the horizontally disposed first and second fuel tanks 17, 18. With this arrangement, the pipe systems 38, 39 are allowed to extend from the central axes 17b, 18b in any direction within the openings 35, 36. Being accommodated in the openings 35, 36, the pipe systems 38, 39 and the non-illustrated auxiliary devices associated therewith are kept safe by means of the left and right rear frames 14, 15 and the support frame 20.

The left and right openings 35, 36 may be used as spaces for receiving therein opposite end portions of the first and second fuel tanks 17, 18 together with the pipe systems 38, 39 and the auxiliary devices. This arrangement achieves enlargement of the capacity of the fuel tanks 17, 18 and the resulting extension of cruising distance of the vehicle.

As shown in FIG. 6, the sloped rear walls 27b of the left and right front brackets 25, 26 extend obliquely upward in the rearward direction of the vehicle body, and the sloped front walls 32b of the left and right rear brackets 30, 31 extend obliquely upward in the forward direction of the vehicle body. With this arrangement, when the rear bumper beam 60 is subjected to an impact force, the sloped walls 27b, 32b of the front and rear brackets 25, 26 smoothly and efficiently transmit the impact force in the forward direction of the vehicle body. By thus transmitting the impact force, the prescribed stiffness of the left and right rear frames 17, 18 can be maintained.

The rear flanges 33a, 34a of the left and right rear brackets 30, 31 (forming the rear end faces 30a, 31a of the rear brackets 30, 31, as shown in FIG. 2) are offset from the rear end faces 14d, 15d of the left and right rear frames 14, 15 in the forward direction of the vehicle body, and the rear bumper beam 60 is attached to the rear flanges 33a, 34a of the left and right rear brackets 30, 31 transversely across the width of the vehicle body.

Since the rear bumper beam 60 is attached to the rear end faces 30a, 31a of the left and right rear brackets 30, 31 and not to the rear end faces 14d, 15d of the left and right rear frames 14, 15, the rear frames 14, 15 are allowed to further extend rearward to some extent without changing the overall length L of the vehicle body. Due to a mass increased as a result of rearward extension of the rear frames 14, 15, the rear frames 14, 15 are made more resistant to compressive force than before and can withstand greater impact forces acting on the rear end faces 14d, 15d of the rear frames 14, 15. This will increase the degree of damage protection afforded to the fuel tanks 17, 18.

Figure 7:
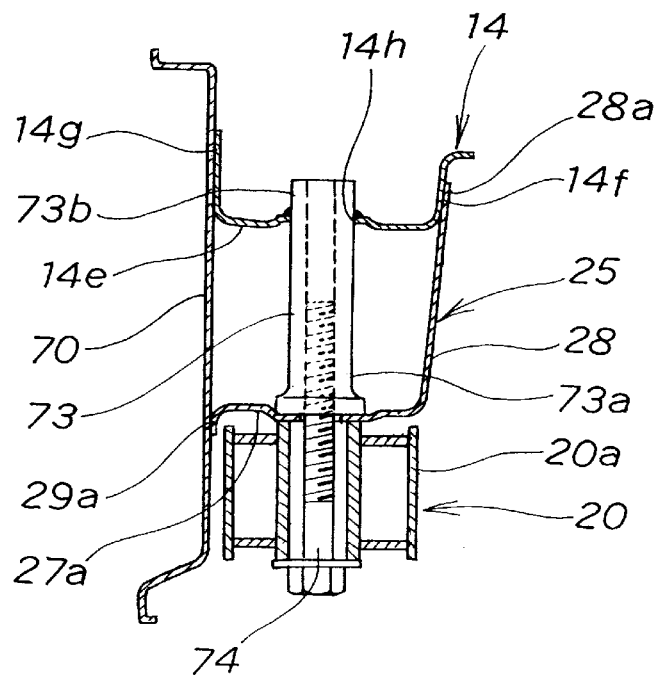
FIG. 7 is a cross-sectional view taken along line 7—7 of FIG. 6.

FIG. 7 is a cross-sectional view taken along line 7—7 of FIG. 6. As shown in this figure, the left rear frame 14 has a generally U-shaped cross section. The left inside sill extension 70 is attached to the outer side surface 14g of the U-shaped left rear frame 14. The upper end portion 28a of the inner sidewall 28 of the left front bracket 25 is attached to the inner side surface 14f of the U-shaped left rear frame 14, and the side flange 29a of the left front bracket 25 is attached to the left inside sill extension 70. An upper end portion 73b of the front sleeve nut 73 is connected to a front attachment hole 14a of the left rear frame 14. A front bolt 74 extends through the left front end 20a of the support frame 20 and is threaded into the front sleeve nut 73 so that the left front end 20a of the support frame 20 is connected to the left rear frame 14 via the left front bracket 25.

As described previously, the left front bracket 25 and the right front bracket 26 are mirror images of each other. It will readily be appreciated that the right front end 20a of the support frame 20 and the front end 15a of the right rear frame 15 are connected together by a similar bolt with the right front bracket 26 disposed therebetween.

Figure 8:
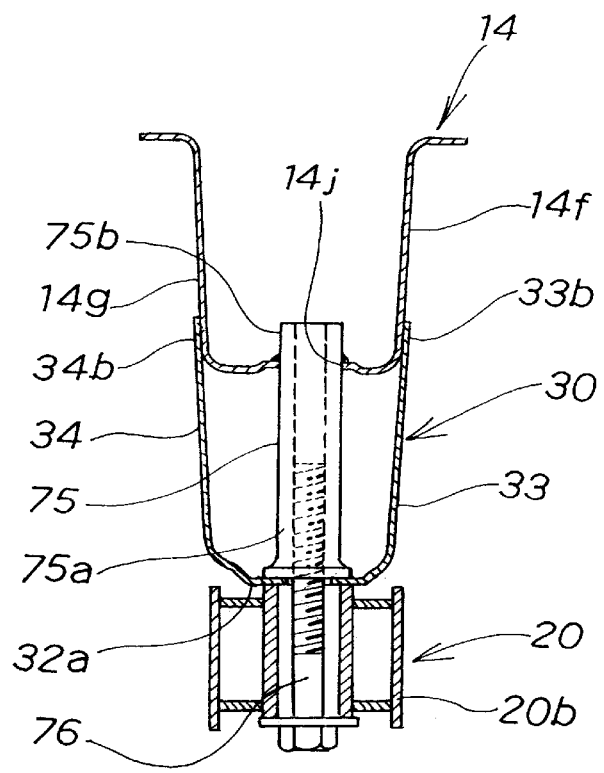
FIG. 8 is a cross-sectional view taken along line 8—8 of FIG. 6.

Turning next to FIG. 8, there is shown a cross section taken along line 8—8 of FIG. 6. As shown in FIG. 8, the upper end portion 34b of the outer sidewall 34 of the left rear bracket 30 is attached to the outer side surface 14g of the left rear frame 14, and the upper end portion 33b of the inner sidewall of the left rear bracket 30 is attached to the inner side surface 14f of the left rear frame 14. An upper end portion 75b of the rear sleeve nut 75 is connected to a rear attachment hole 14j of the left rear frame 14. A rear bolt 76 extends through the left rear end 20b of the support frame 20 and is threaded in the rear sleeve nut 75 so that the left rear end 20b of the support frame 20 is connected to the left rear frame 14 via the left rear bracket 30.

As described previously, the left rear bracket 30 and the right rear bracket 31 have the same construction. It will readily be appreciated that the right rear end 20a of the support frame 20 and the rear end 15b of the right rear frame 15 are connected together by a similar bolt with the right rear bracket 31 disposed therebetween.

Operation of the vehicle body rear part structure 10 will be described with reference to FIGS. 9A–9B and 10.

Figure 9A:
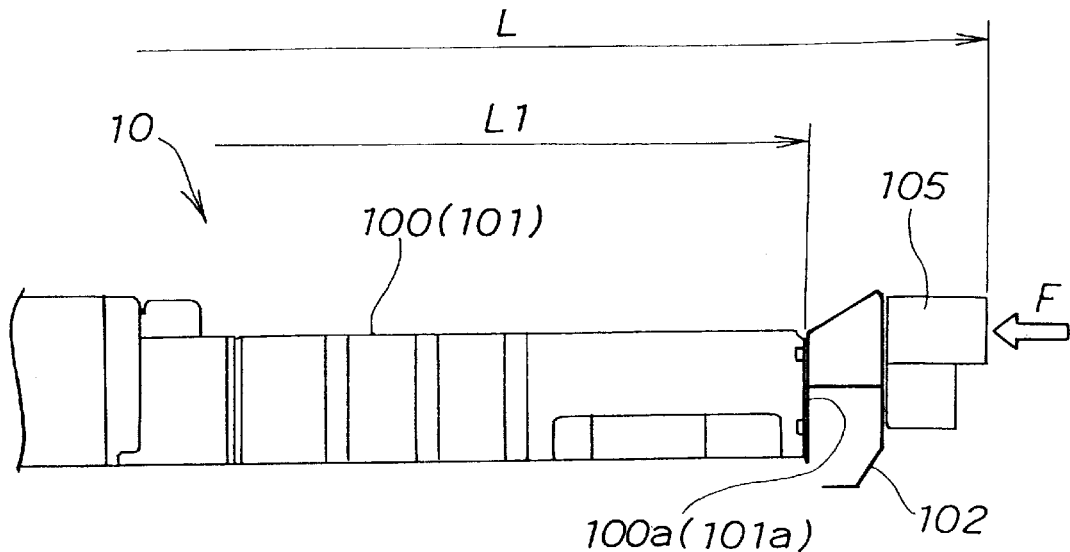
FIGS. 9A and 9B are diagrammatical side views illustrative of the operation of a conventional vehicle body rear part structure and the operation of the vehicle body rear part structure embodying the present invention, respectively.

FIG. 9A shows, for comparative purposes, an example of the conventional vehicle body rear part structures, in which a bumper beam 105 is attached through a mounting bracket 102 to rear end faces 100a, 101a of left and right rear frames 100, 101. In this structure, when the bumper beam 105 is subjected to a relatively small impact force F, it may undergo collapsing to thereby absorb the impact force F. When the impact force F applied to the bumper beam 105 is relatively large, not only the bumper beam 105 but also the left and right rear frames 100, 101 may undergo collapsing to thereby absorb the impact force F.

In view of fuel tanks (not shown) being disposed between the left and right rear beams 100, 101, it is desirable for the rear frames 100, 101 to absorb larger impact forces with improved efficiencies. In case of the conventional vehicle body rear part structure, however, since the bumper beam 105 is attached to the rear end faces 100a, 101a of the left and right rear frames 100, 101 via the mounting bracket 102, the length L1 of the rear frames 100, 101 cannot be extended unless otherwise specified to extend the overall length L of the vehicle body.

Figure 9B:
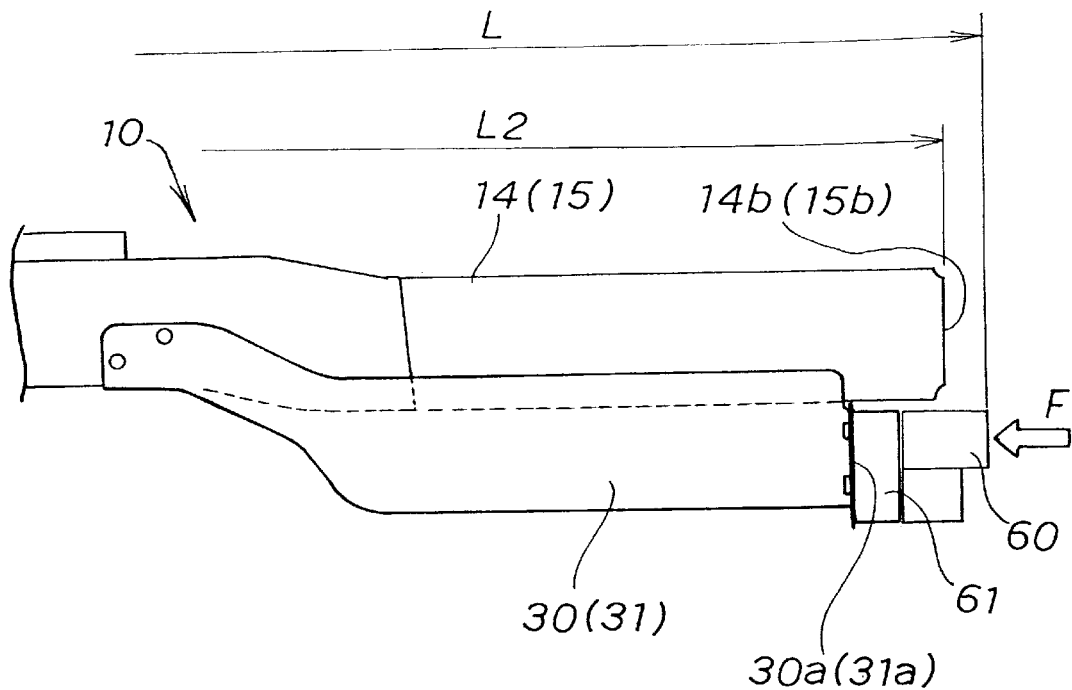

FIG. 9B shows an example of the vehicle body rear part structure 10 according to the present invention, in which the rear end faces 30a, 31a of the left and right rear brackets 30, 31 are offset from the rear end faces 14b, 15b of the left and right rear frames 14, 15 in the forward direction of the vehicle body, and the bumper beam 60 is attached through a mounting bracket 61 to the rear end faces 30a, 31a of the left and right rear brackets 30, 31.

In this arrangement, since the rear end faces 14b, 15b of the rear frames 14, 15 are free from the bumper beam 60, the length L2 of the rear frames 14, 15 can be extended to some extent in the rearward direction without changing the overall length L of the vehicle body. The rear frames 14, 15 may have a larger length than the conventional rear frames 100,101, as understood from comparison between FIG. 9A and FIG. 9B.

Rearward extension of the rear frames 14, 15 increases the mass of the rear frames 14, 15, and the rear frames 14, 15 are made more resistant to compressive forces than before. Accordingly, the rear frames 14, 15 can withstand greater impact forces and provide a higher degree of damage protection to the fuel tanks 17, 18 (FIG. 6).

Stated more specifically, when the bumper beam 60 is subjected to a relatively small impact force F, it may undergo collapsing to thereby absorb the impact force F. When the impact force F applied to the bumper beam 60 is relatively large, the rear frames 14, 15 may also undergo collapsing. In this instance, however, since the rear frames 14, 15 are extended rearward as compared to the conventional rear frames 100, 101 of FIG. 9A, they can efficiently absorb the large impact force F and thus protect the fuel tanks 17, 18 safely against damage.

Figure 10:
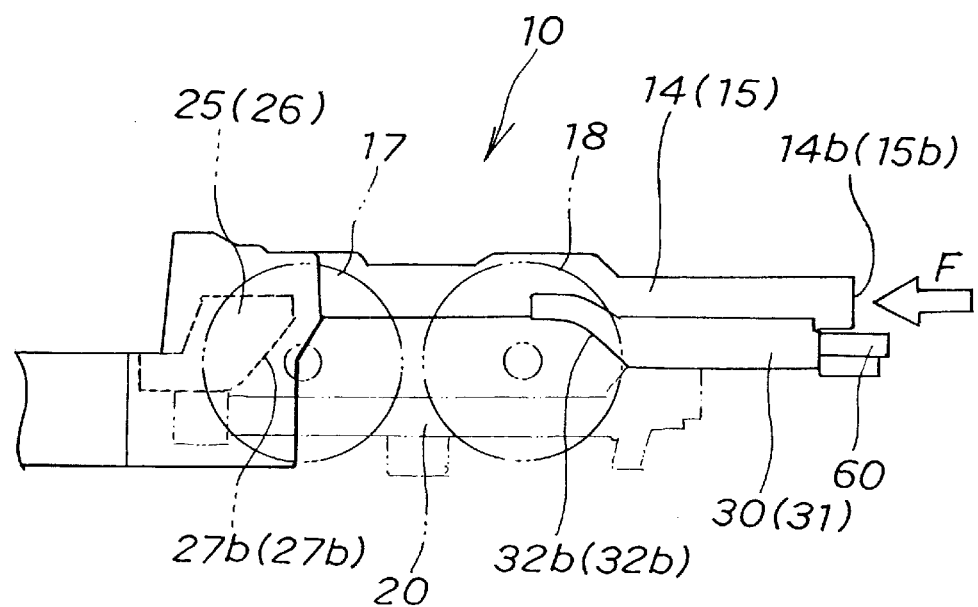
FIG. 10 is a diagrammatical side view explanatory of the operation of the vehicle body rear part structure according to the present invention.

As shown in FIG. 10, the sloped rear walls 27b, 27b of the left and right front brackets 25, 26 extend obliquely upward in the rearward direction of the vehicle body, while the sloped front walls 32b, 32b of the left and right rear brackets 30, 31 extend obliquely upward in the forward direction of the vehicle body.

With this arrangement, when an impact force applied to the rear bumper beam 60 acts on the rear end faces 14b, 15b of the left and right rear frames 14, 15 and the rear end faces 30a, 31a (FIG. 9B) of the rear brackets 30, 31, the sloped walls 27b, 32b operate to transmit the impact force smoothly and efficiently in the forward direction of the vehicle. By thus transmitting the impact force, it is possible to prevent stress concentration from occurring at connections between the rear frames 14, 15 and the rear brackets 30, 31 and between the front brackets 25, 26 and the rear frames 14, 15. Thus, the prescribed strength of the vehicle body rear part structure 10 can be maintained and the fuel tanks 17, 18 are kept safely even when a collision occurs.

Figure 11:
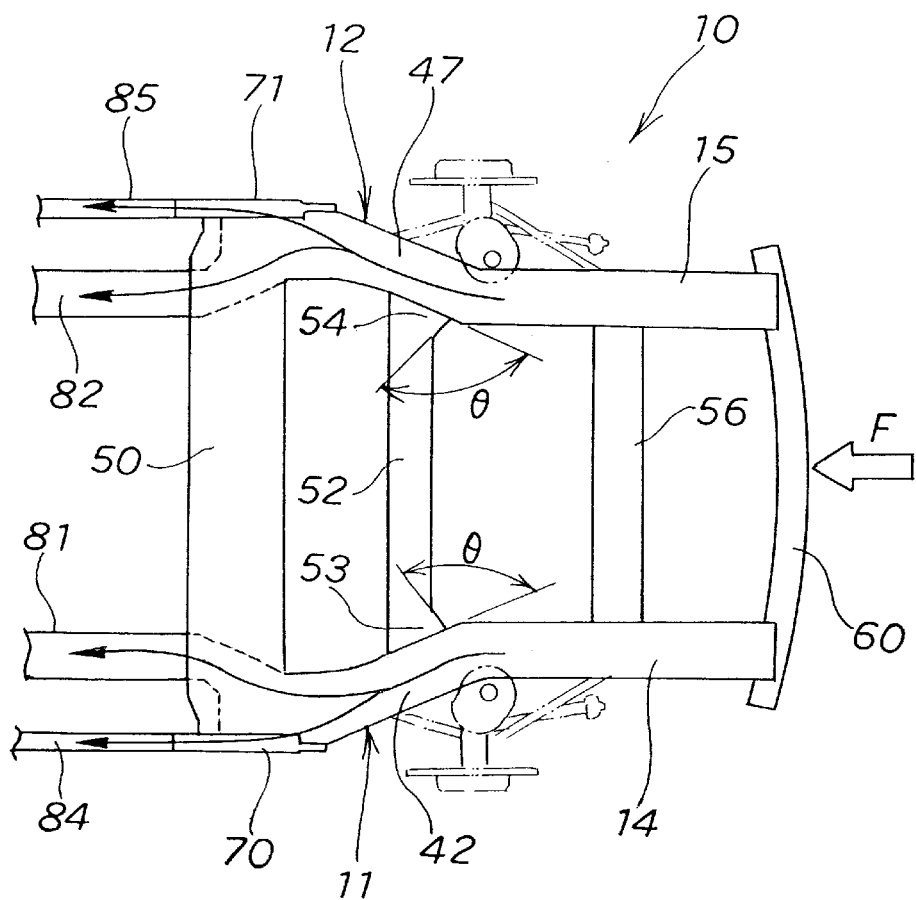
FIG. 11 is a plan view of FIG. 10, showing the manner in which an impact force applied to a bumper beam of the vehicle body rear part structure is transmitted.

FIG. 11 shows a schematic plan view of the vehicle body rear part structure 10 according to the present invention. As shown in this figure, the left and right middle frames 81, 82 extend forward from the front ends of the left and right rear frames 14, 15 and the left and right inside sills 84, 85 extend forward from the left and right inside sill extensions 70, 71.

With this arrangement, when the rear ends of the rear frames 14, 15 are subjected to an impact force applied through the bumper beam 60, part of the impact force F acting on each rear frame 14, 15 is distributed in a branched fashion to the associated middle frame 81, 82 and inner side sill 84, 85. By thus distributing the impact force F, the rear frames 14, 15 can withstand greater impact forces and hence provide a higher degree of damage protection to the fuel tanks 17, 18.

Since the rear frames 14, 15 are bent at the slanting portions 42, 47 thereof, the slanting portions 42, 47 are more susceptible to deformation than the other parts 41, 43, 46, 48 (FIG. 2) of the rear frames 14, 15. In view of this, the central cross member 52 is provided to reinforce the slanting portions 42, 47. Furthermore, the opposite end portions 53, 54 of the central cross member 52 are so configured as to flare rearward and outward in such a manner that each of the flared end portions 53, 54 extends at an angle θ of from 90 to 180 degrees relative to the longitudinal axis of a corresponding one of the slanting portions 42, 47. By thus flaring the opposite end portions 53, 54, the central cross member 52 can bear a larger force or load applied thereto through the slanting portions 42, 47 when the left and right rear frames 14, 15 are subjected to an impact force.

Obviously, various minor changes and modifications are possible in the light of the above teaching. It is to be understood that within the scope of the appended claims the present invention may be practiced otherwise than as specifically described.

The present disclosure relates to the subject matter of Japanese Patent Application No. 2001-262725, filed Aug. 31, 2001, the disclosure of which is expressly incorporated herein by reference in its entirety.

What is claimed is:

1. A rear part structure of a vehicle body, comprising:
   a left rear frame and a right rear frame extending longitudinally of the vehicle body;
   a plurality of parallel spaced cylindrical fuel tanks disposed horizontally between the left and right rear frames, the cylindrical fuel tanks having longitudinal axes extending normal to the left and right rear frames and located below the center of a height of the left and right rear frames; and
   a cross member disposed between two adjacent ones of the fuel tanks and extending between the left and right rear frames.

2. The rear part structure of the vehicle body according to claim 1, wherein the left and right rear frames are each formed from a bent frame including a first straight portion extending in a longitudinal direction of the vehicle body, a slanting portion extending obliquely inward from a rear end of the first straight portion toward a longitudinal centerline of the vehicle body, and a second straight portion extending from a rear end of the slanting portion in the longitudinal direction of the vehicle body, and the cross member extends between the slanting portions of the left and right rear frames.

3. The rear part structure of the vehicle body according to claim 2, wherein the cross member has opposite end portions flared such that each of the flared end portions extends at an angle of from 90 to 180 degrees relative to the longitudinal axis of the slanting portion of a corresponding one of the left and right rear frames.

* * * * *